United States Patent
Niece (10) Patent No.: US 7,467,770 B2
(45) Date of Patent: Dec. 23, 2008

(54) MOUNTING BRACKET FOR BICYCLE SAFETY LIGHTS

(76) Inventor: Edward J. Niece, 28613 NW. 38th Ct., Ridgefield, WA (US) 98642

( * ) Notice: Subject to any disclaimer, the term of this patent is extended or adjusted under 35 U.S.C. 154(b) by 50 days.

(21) Appl. No.: 11/479,884

(22) Filed: Jun. 30, 2006

(65) Prior Publication Data

US 2007/0001075 A1  Jan. 4, 2007

Related U.S. Application Data

(60) Provisional application No. 60/696,083, filed on Jul. 2, 2005.

(51) Int. Cl.
*A47B 96/06* (2006.01)
(52) U.S. Cl. .................. 248/230.5; 248/227.3; 224/443
(58) Field of Classification Search ............. 248/230.5, 248/227.3, 406.2, 410, 227.4, 122.1, 231.61, 248/218.4, 219.3; 224/443, 448, 450, 441
See application file for complete search history.

(56) References Cited

U.S. PATENT DOCUMENTS

| | | | | |
|---|---|---|---|---|
| 1,296,060 A * | 3/1919 | Ferguson | ................. | 248/230.5 |
| 2,620,152 A * | 12/1952 | Niles | ........................ | 248/230.1 |
| 2,912,991 A * | 11/1959 | Shinn | ........................ | 135/68 |
| 3,675,530 A * | 7/1972 | Victor | ........................ | 411/433 |
| 4,216,600 A * | 8/1980 | Brueckner et al. | ............. | 42/127 |
| 4,597,690 A * | 7/1986 | Girard | ........................ | 403/391 |
| 4,898,429 A * | 2/1990 | Plumer | .................. | 301/35.632 |
| 5,303,887 A * | 4/1994 | Hasty et al. | ................ | 248/68.1 |
| 6,082,646 A * | 7/2000 | Clarke et al. | ................ | 241/182 |
| 6,390,427 B1 * | 5/2002 | McConnell et al. | .... | 248/231.61 |
| 2002/0070324 A1 * | 6/2002 | Huang | .................... | 248/311.2 |

\* cited by examiner

*Primary Examiner*—Kimberly Wood
(74) *Attorney, Agent, or Firm*—Rylander & Associates PC; Kurt M. Rylander; Mark E. Beatty (57) ABSTRACT

A bicycle mounting bracket for safety lights is provided to mount to different portions of a bicycle to provide a mount for standard bicycle safety lights. A bicycle mounting bracket for safety lights includes a base bracket with a post, rear portion, side bosses with screw holes, radius grooves, and a center slot; a clamp band with an arch, side bosses with screw holes, and nut recess pockets; and attaching portions. Attaching portions can be one or more twist ties, cable ties, screws with nuts, hooks, pins, dowels, tape, twine, wire, and fishing line. One or more shims can also be provided.

3 Claims, 14 Drawing Sheets

MOUNTING BRACKET FOR BICYCLE SAFETY LIGHTS

CROSS-REFERENCE TO RELATED APPLICATION

This application claims benefit of priority of prior co-pending Provisional Application Ser. No. 60/696,083, filed Jul. 2, 2005.

FIELD OF THE INVENTION

The present invention relates to bicycle safety light mounts. More particularly, the present invention relates to mounts for bicycles to which standard bicycle safety lights can be attached.

BACKGROUND

Most bicycles as supplied from the manufactures are provided with reflectors mounted on the seat post and on the front of the bicycle, allowing motor vehicle drivers to see the reflectors when approaching bicycle riders from the front and the back of the rider. Bicycle riders are required to ride with the flow of traffic, making riders more vulnerable to motor vehicles approaching behind the rider. Flashing red safety lights are available to bicyclists to further alert motor vehicle drivers to a bicyclist. Flashing red safety lights typically are mounted onto the seat post extension below the bicycle seat. Because most bicycle seat post extensions are round, round adjustable mounting brackets are needed to attach the safety light to the bicycle seat post. The brackets are configured in such a way as to allow the light to articulate at different angles if necessary. Most safety lights are limited to mounting on the seat post or handlebars and generally do not fit on other areas of the bicycle due the tubular frame being smaller in diameter than the seat post or handlebars. Even when mounted elsewhere, the bike light is likely to be insecurely fastened because of the discrepancy between the mount size and the bike part size to which the light is attached, or at an incorrect angle for optimal visibility. If a bicyclist has installed a back rack on the rear portion of the bike, and carries a pack on this rack, the pack or gear will block the safety light from being seen by motor vehicle drivers approaching from behind, rendering the safety light useless. In many cases the round mounting bracket supplied with the safety light is removed from the light in order to secure the safety light to other areas on the bike. This round bracket is necessary to the safety light in order for the light to articulate and remain in a fixed position, as both the bracket and the light are securely geared where attached to one another. Presently there are few provisions for mounting the safety light anywhere but on the seat post or the handlebars.

Thus, there is a need for a versatile mounting bracket that can be secured to different parts of the bike including not only the seat post or handlebars but also the bike frame or back rack.

SUMMARY AND ADVANTAGES

A bicycle mounting bracket for safety lights is provided to mount to different portions of a bicycle to provide a mount for standard bicycle safety lights. The bicycle mounting bracket for safety lights includes a base bracket with a post, rear portion, side bosses with screw holes, radius grooves, and a center slot, a clamp band with an arch, side bosses with screw holes, and nut recess pockets, and attaching portions. Attaching portions can be one or more cable ties, and two screws with nuts. One or more shims can also be provided.

The bicycle mounting bracket for safety lights presents numerous advantages, including: (1) versatility in the placement of lights on a bicycle, (2) facilitates a fast, efficient manner of attaching additional lights onto a bike, (3) easily detached from the bike, (4) stabilizes the light on the bike, (5) does not compromise the strength or integrity of the bicycle frame, and (6) several can be used at one time to create a comprehensive light system for added safety.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
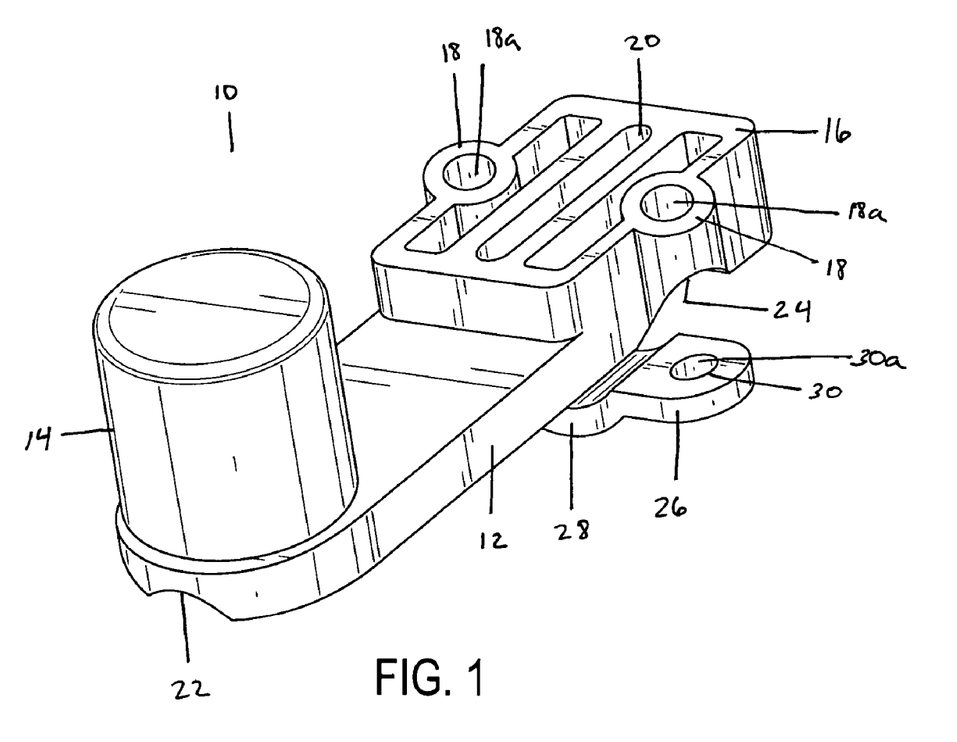
FIG. 1 shows a perspective view of an embodiment of a mounting bracket for bicycle safety lights.
Figure 2:
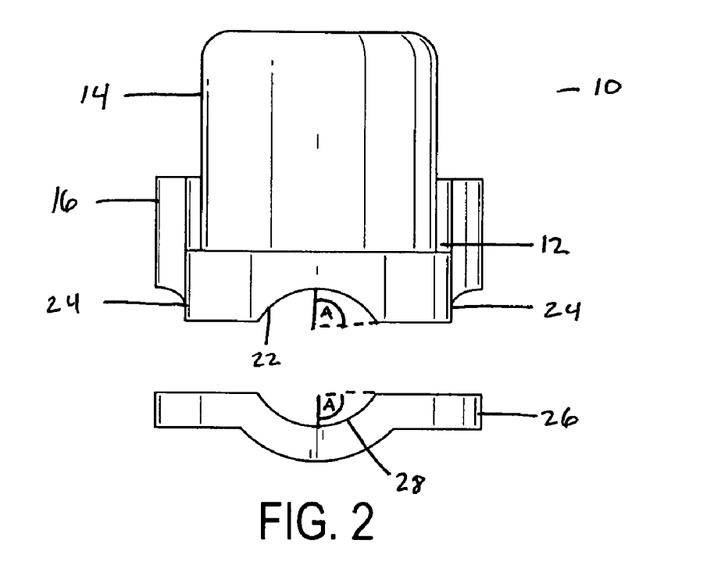
FIG. 2 shows a front view of an embodiment of a mounting bracket for bicycle safety lights.
Figure 3:
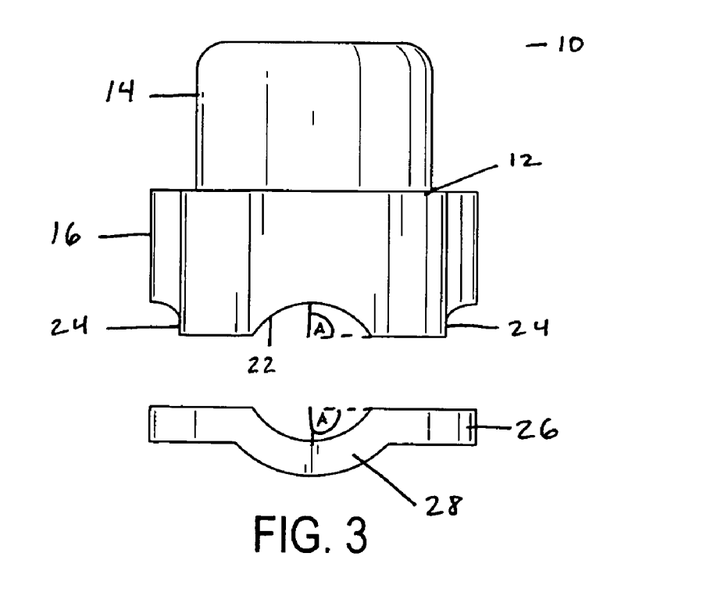
FIG. 3 shows a back view of an embodiment of a mounting bracket for bicycle safety lights.
Figure 4:
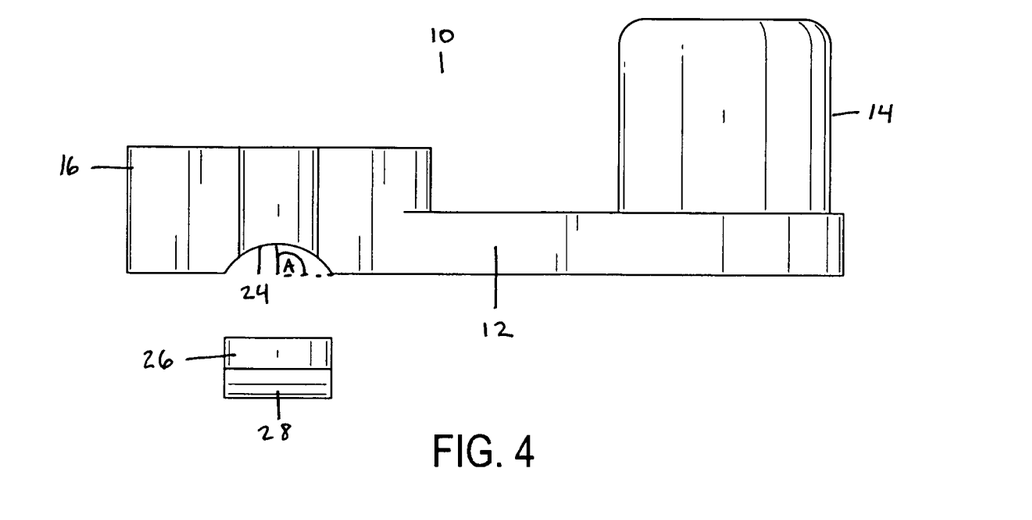
FIG. 4 shows side view of an embodiment of a mounting bracket for bicycle safety lights.
Figure 5:
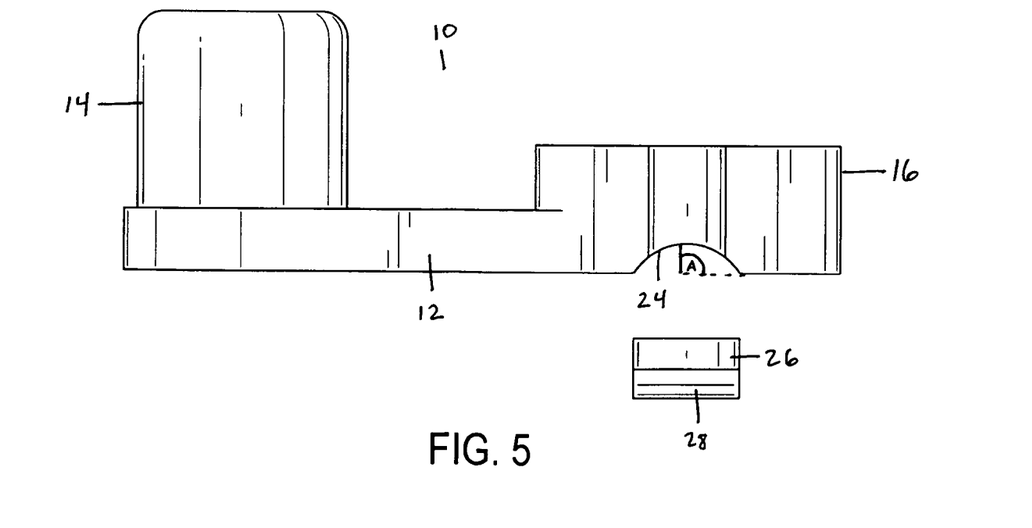
FIG. 5 shows an alternate side view of an embodiment of a mounting bracket for bicycle safety lights.
Figure 6:
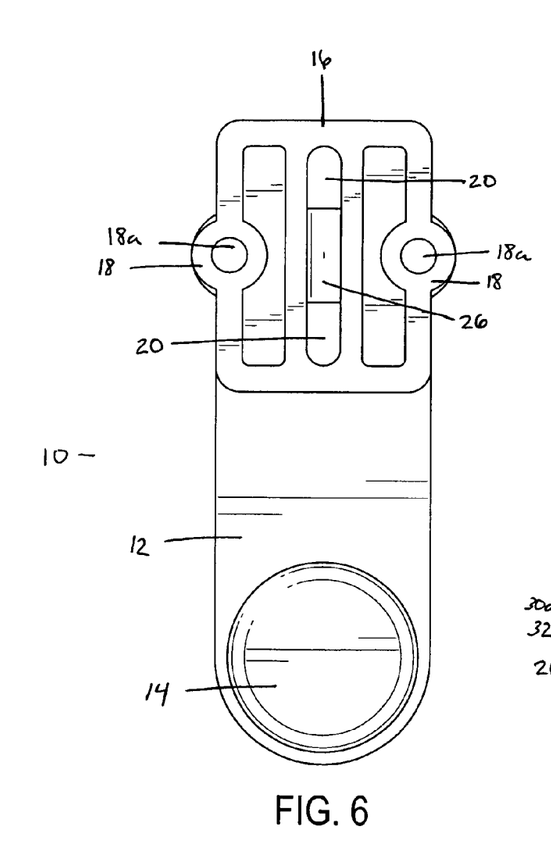
FIG. 6 shows a top view of an embodiment of a mounting bracket for bicycle safety lights.
Figure 18:
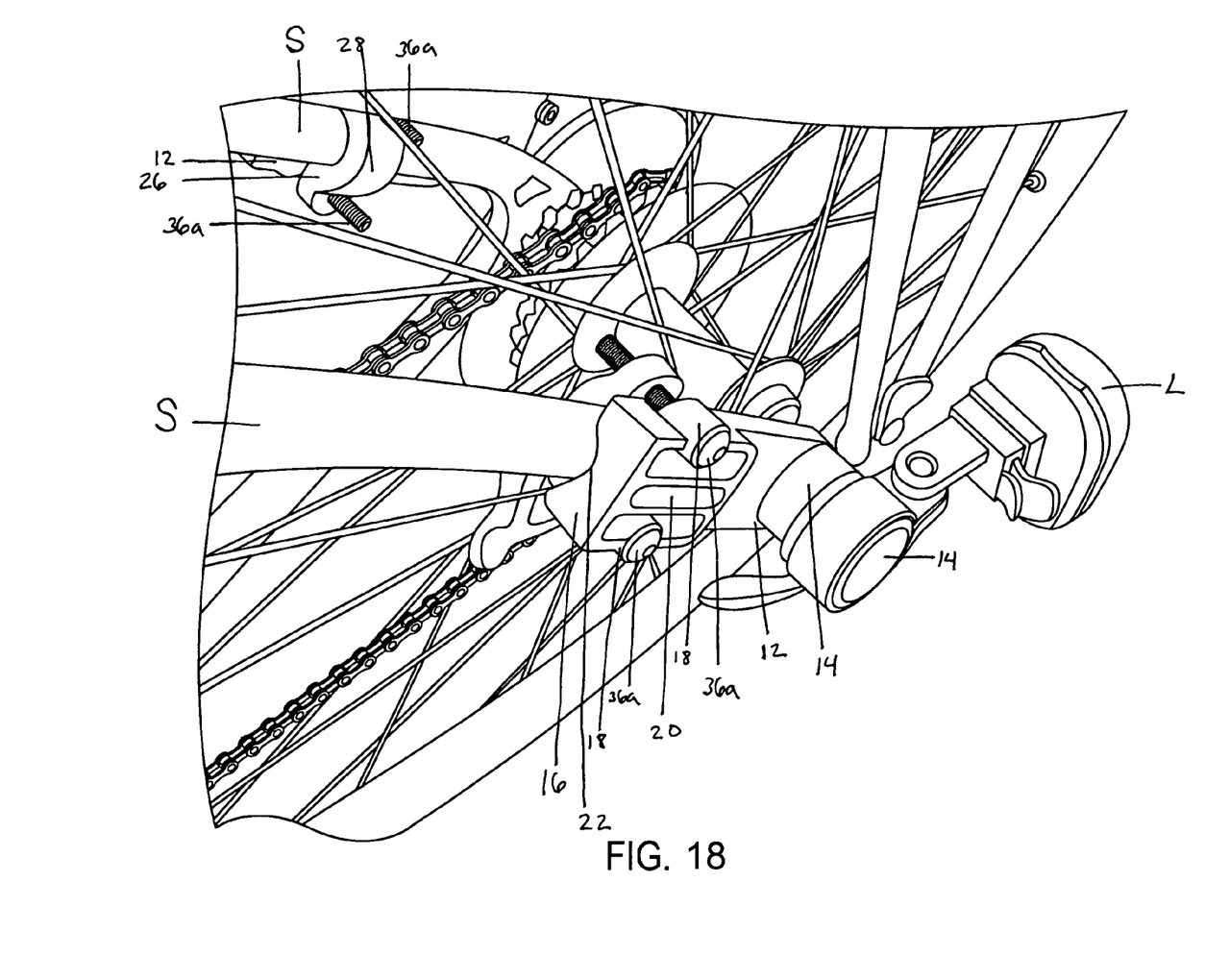
FIG. 18 shows a perspective view of an embodiment of two mounting brackets for bicycle safety lights in use.
Figure 19:
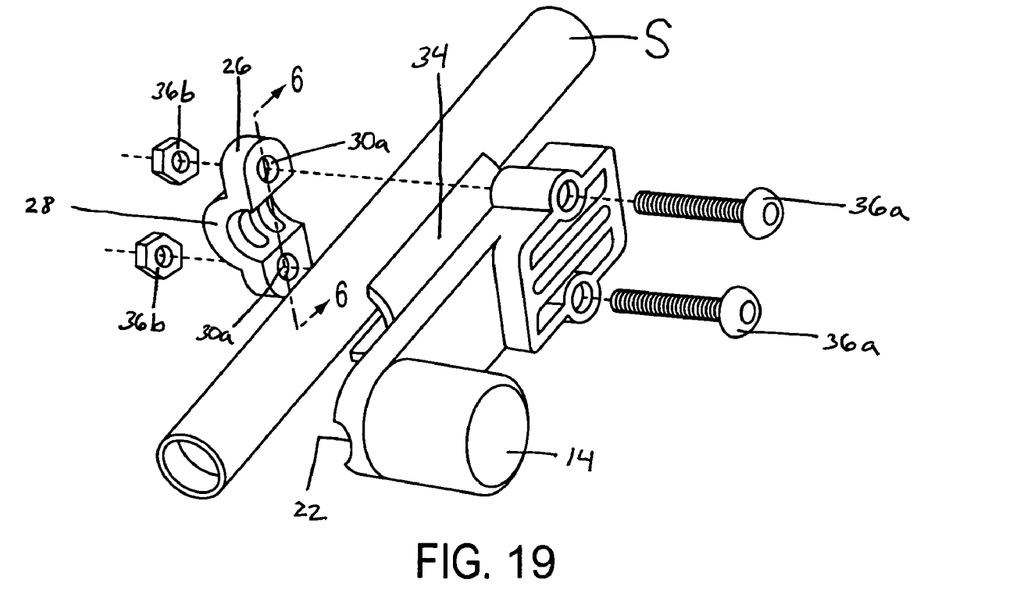
FIG. 19 shows a perspective view of an embodiment of a mounting bracket for bicycle safety lights in use.
Figure 20:
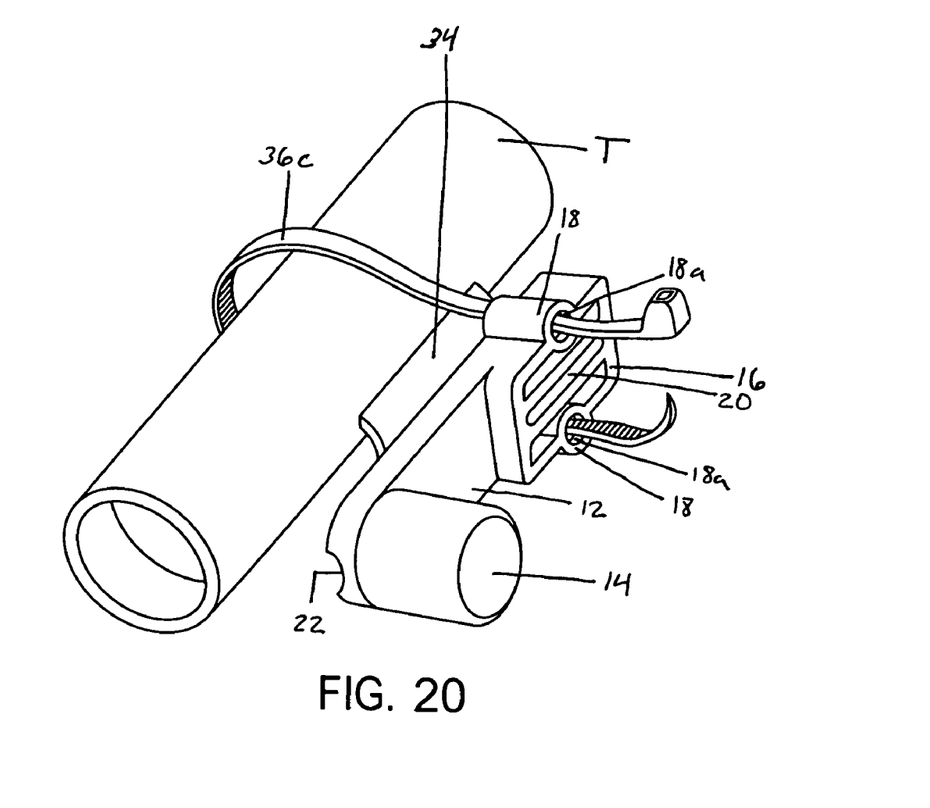
FIG. 20 shows a perspective view of an embodiment of a mounting bracket for bicycle safety lights in use.

As shown in FIGS. 1-21, a bicycle mounting bracket for safety lights 10 to mount to different portions of a bicycle to provide a mount for standard bicycle safety lights. As shown in FIGS. 1, 19-20, a bicycle mounting bracket for safety lights 10 includes a base bracket 12 with a post 14, rear portion 16, side bosses with screw holes 18, radius grooves 22, 24, and a center slot 20, a clamp band 26 with an arch 28, side bosses with screw holes 30, and nut recess pockets 32, and attaching 20 portions which can include one or more cable ties 36c, or at least one screw 36a and a nut 36b. Mounting bracket 10 can further be provided with shims 34.

Light mounting bracket 10 can be positioned on the bike frame in areas other than the bicycle seat post and handlebars. When one or more bicycle safety light mounting brackets 10 are installed in separate areas on the bicycle, a bicyclist is more easily seen and identified by motor vehicle drivers approaching the rider. The light mounting bracket 10 is preferably made of injection molded plastic, but can also be made of metal or other materials. The standard color of the mounting bracket 10 is preferably black, but can be painted to match the color of the bicycle.

Figure 7:
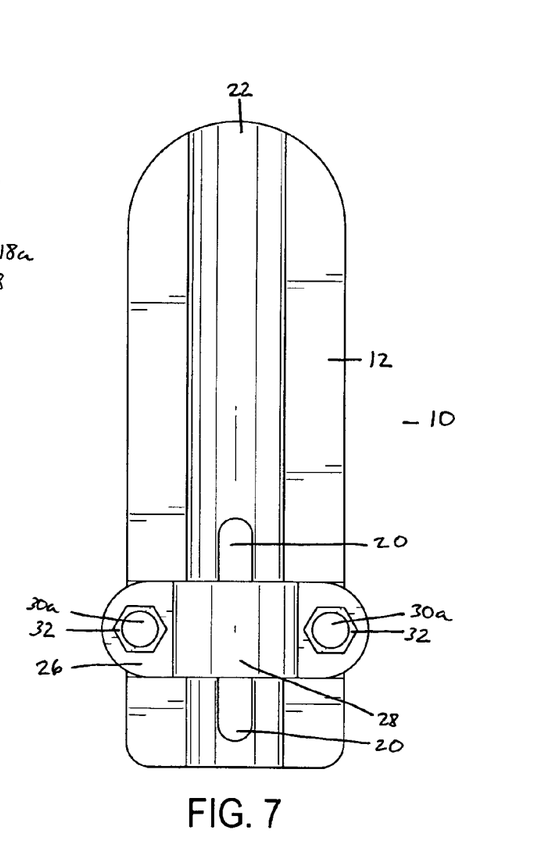
FIG. 7 shows a bottom view of an embodiment of a mounting bracket for bicycle safety lights.
Figure 8:
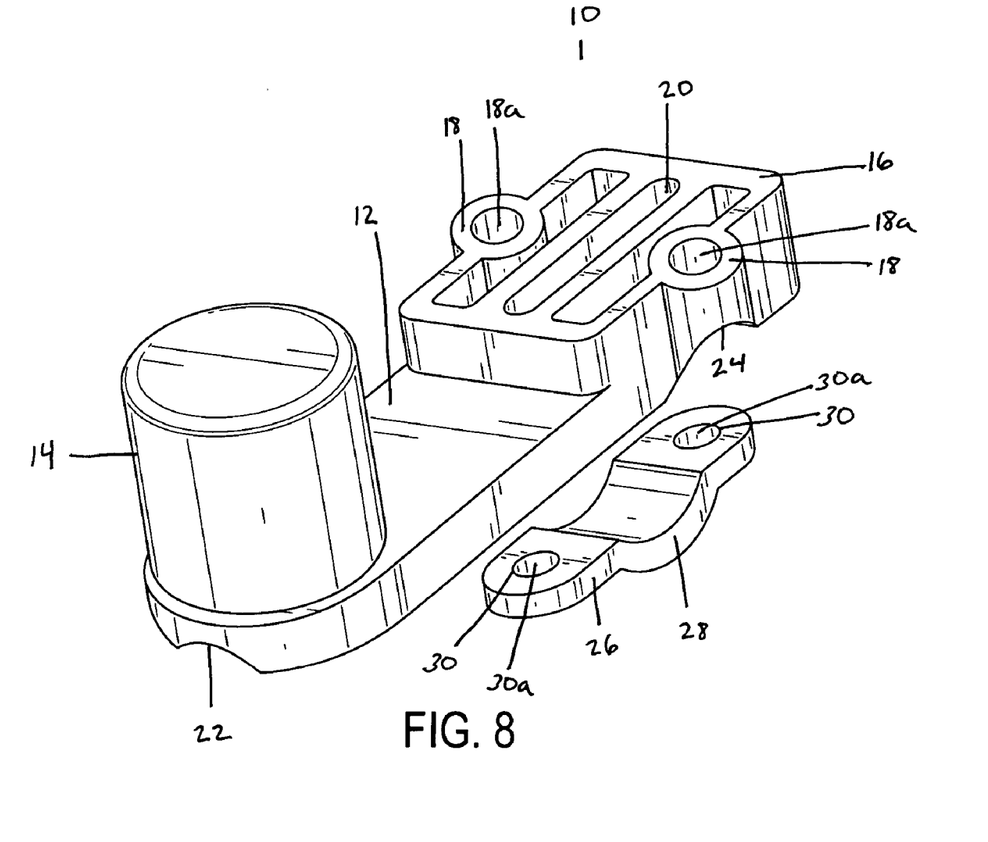
FIG. 8 shows a perspective view of an embodiment of a mounting bracket for bicycle safety lights.
Figure 9:
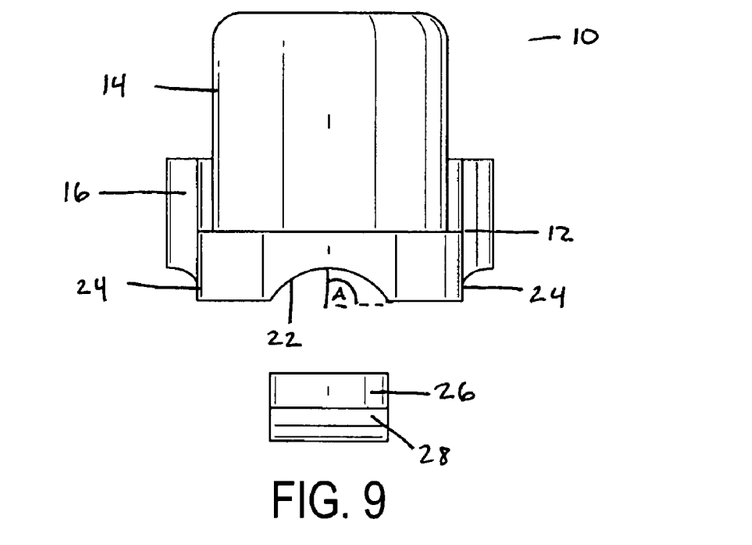
FIG. 9 shows a front view of an embodiment of a mounting bracket for bicycle safety lights.
Figure 10:
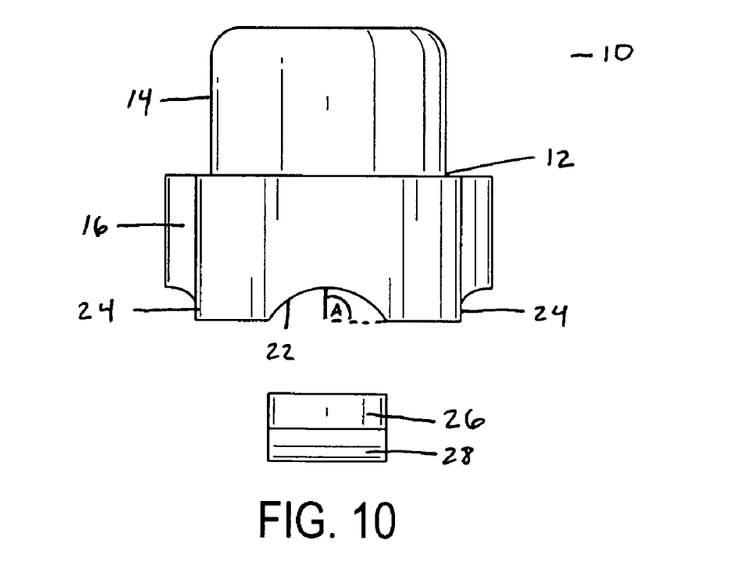
FIG. 10 shows a back view of an embodiment of a mounting bracket for bicycle safety lights.
Figure 11:
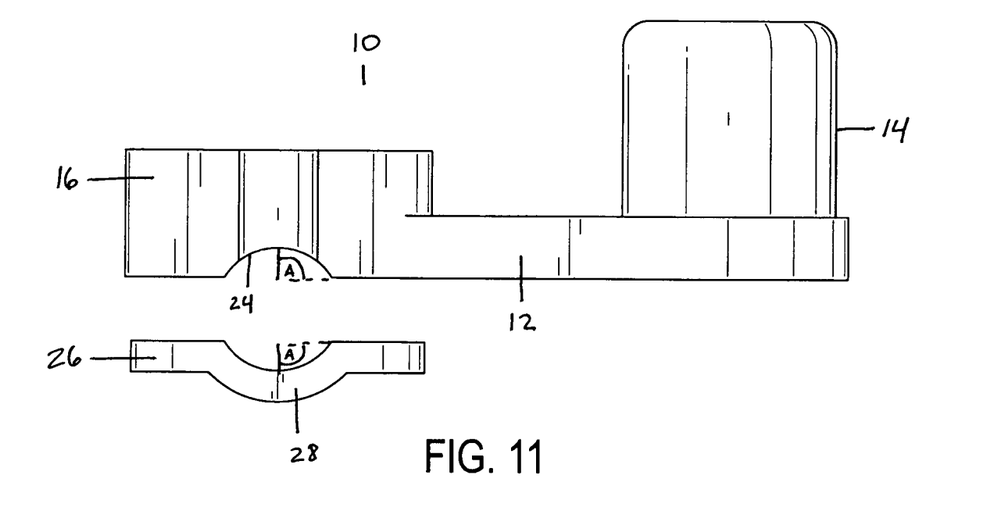
FIG. 11 shows a side view of an embodiment of a mounting bracket for bicycle safety lights.
Figure 12:
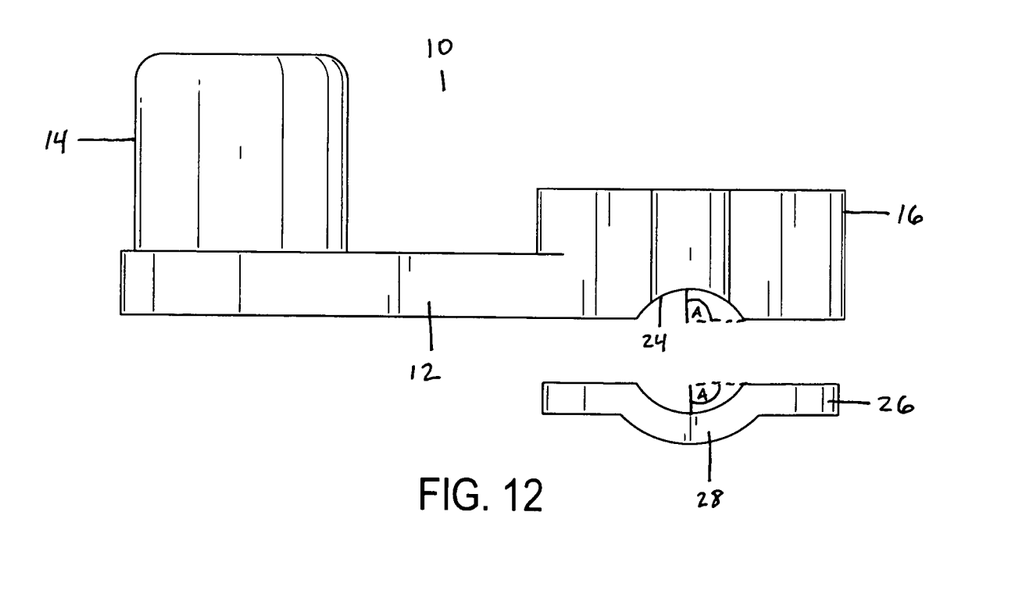
FIG. 12 shows an alternate side view of an embodiment of a mounting bracket for bicycle safety lights.
Figure 13:
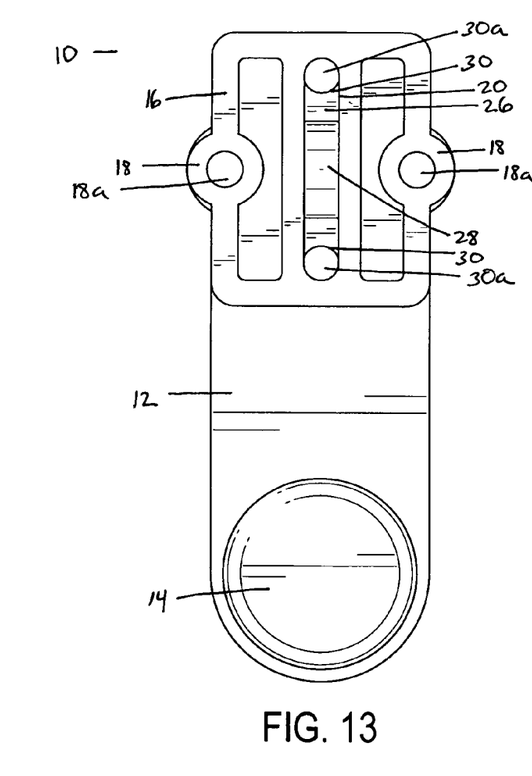
FIG. 13 shows a top view of an embodiment of a mounting bracket for bicycle safety lights.
Figure 14:
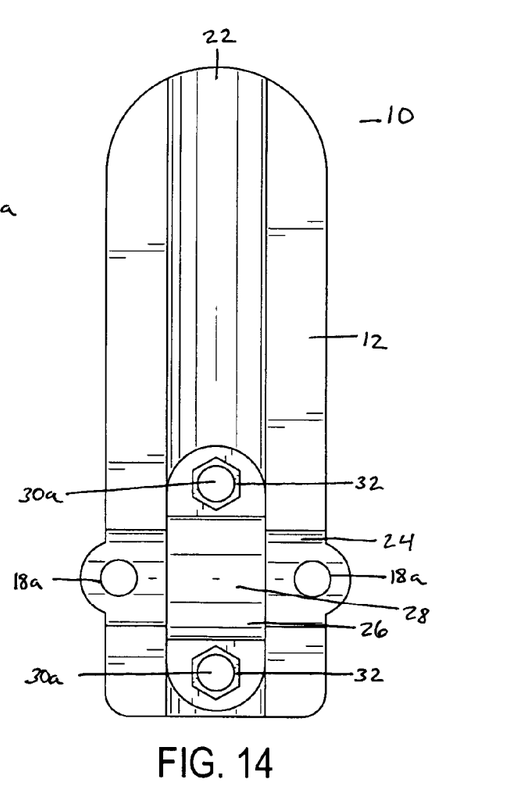
FIG. 14 shows a bottom view of an embodiment of a mounting bracket for bicycle safety lights.
Figure 15:
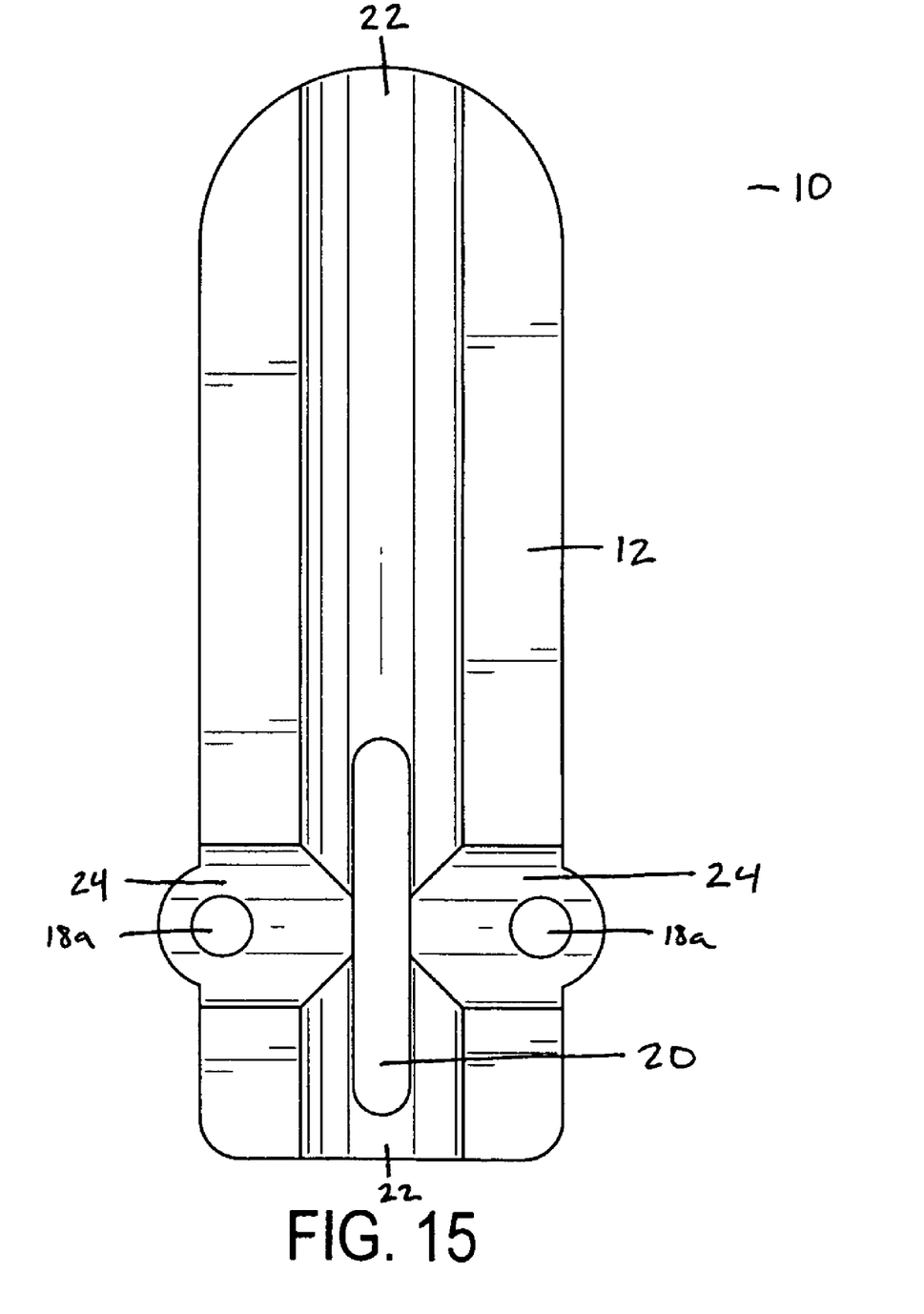
FIG. 15 shows a bottom view of an embodiment of a mounting bracket for bicycle safety lights.

As shown in FIGS. 1-6, 8-13, 16-20, base bracket 12 is preferably an oblong strip, one side having a post 14 extending outward from the bracket 12 and a rear portion 16 that is raised from the body of the strip. On the opposite side of the post 14, as shown in FIGS. 7, 14, and most clearly depicted in FIG. 15, base bracket 12 preferably has two radius grooves 22, 24—a longitudinal radius groove 22 extending the length of the bracket 12, and a latitudinal radius groove 24 extending across the width of the bracket 12, crossing the longitudinal radius groove 22. This allows the bracket 12 to fit over the majority of round bike forks and frames. A center slot 20, within the longitudinal radius groove 22, allows for the placement of an attaching portion, such as cable ties 36c or screws 36a and nuts 36b, through the base bracket's 12 longitudinal radius groove 22. Preferably, the radius grooves 22, 24 of the base bracket 12 each have the same arc angle A as the clamp band arch 28, although the radius grooves 22, 24 preferably each have a smaller arc length than the arc length of the clamp band arch 28. Preferably, the longitudinal radius groove 22 and the latitudinal radius groove 24 each have a ⅝ inch (15.875 millimeter) radius. Preferably, the width of base bracket 12, such as from receiver boss 18 to receiver boss 18 in an embodiment with two receiver bosses 18, is 1 9/16 inches (39.6875 mm).

Base bracket 12 is also preferably provided with side bosses 18 in line with the latitudinal radius groove 24 having screw holes 18a which allow for placement of attaching portions such as screws 36a through the base bracket's 12 latitudinal groove 24. Preferably there are two rounded bosses 18 at the sides of the base bracket 12 that are preferably drilled to form screw holes 18a to accommodate a 10×32×1¼ screw 36a (U.S. Unified Thread Standard sized screw, such that the thread length is 1¼ inches, or 31.75 mm) with a corresponding nut 36b to fit the nut recess pocket 32 in the clamp band 26.

As shown in FIGS. 1, 4-6, 8, 11-13, 16-20, the rear portion 16 is opposite the post 14 on the bracket 12. Preferably the rear portion 16 contains two receiver bosses 18 with screw holes 18a and a center slot 20. Two receiver bosses 18 are preferably opposite one another. In another embodiment, only one receiver boss 18 with a screw hole 18a is provided on the bracket 12.

Figure 16:
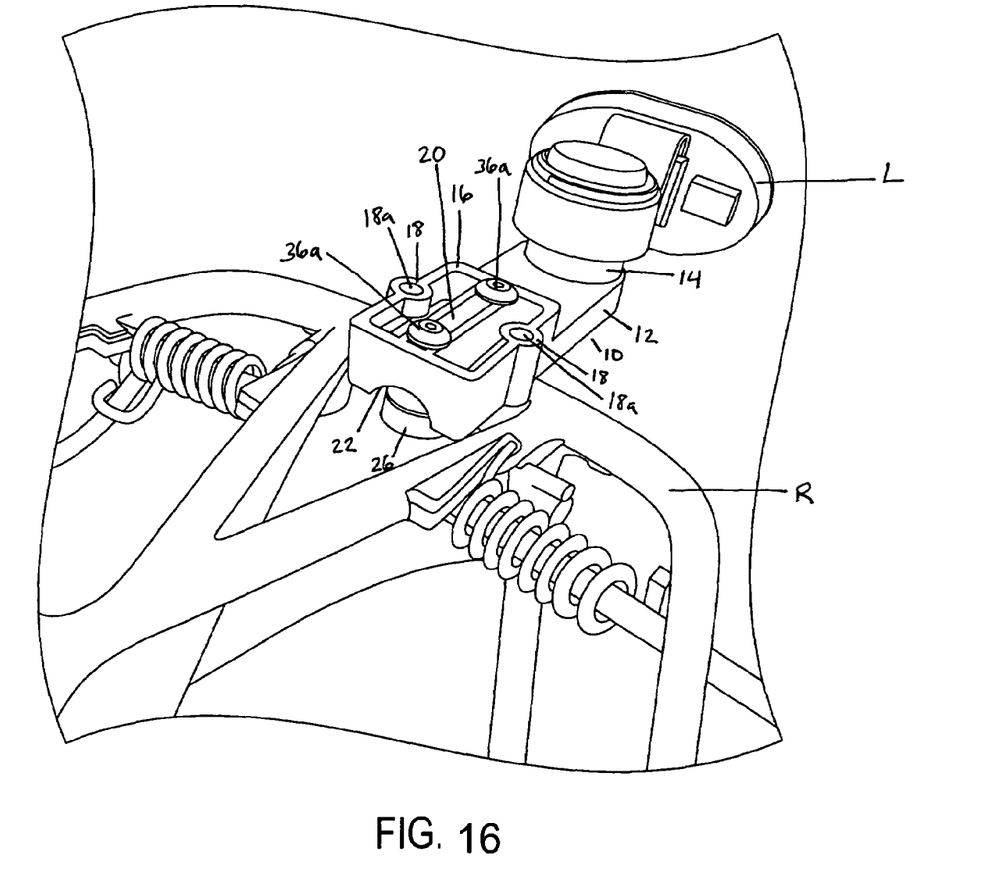
FIG. 16 shows a perspective view of an embodiment of a mounting bracket for bicycle safety lights in use.
Figure 17:
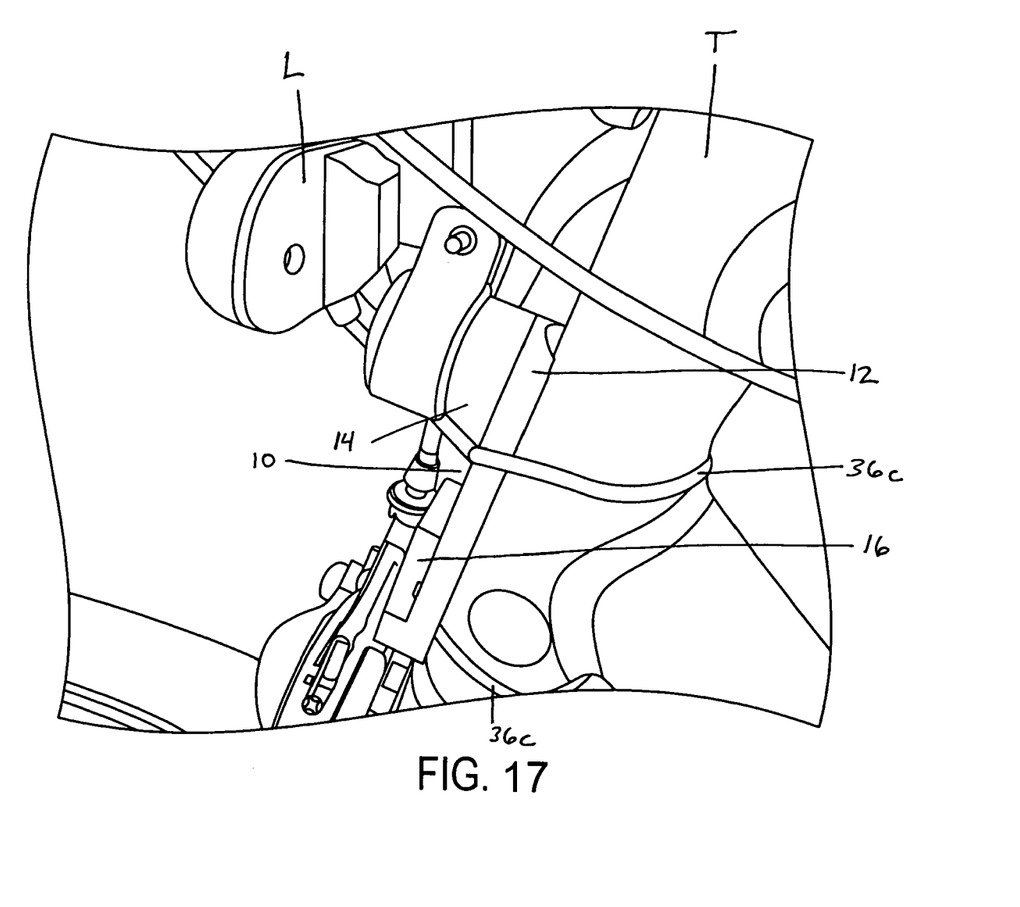
FIG. 17 shows a side view of an embodiment of a mounting bracket for bicycle safety lights in use.

Base bracket 12 may include either the center slot 20 and the longitudinal radius groove 22, or the side bosses 18 with screw holes 18a and the latitudinal radius groove 24, since either mechanism will secure the base bracket 12 to the bicycle. Having both radius grooves 22, 24, along with the center slot 20 and receiver bosses 18 with the clamp band 26, however, is preferred since it allows the user to secure the mounting bracket 10 either parallel or perpendicular to the bike part to which it is secured, as shown in FIGS. 16 and 17. Preferably, the base bracket 12 is approximately 3¾ inches (95.25 mm) long and 1 3/32 inches (27.7876 mm) wide. The base bracket 12 thickness is preferably 9/16 inches (14.2875 mm) at the rear portion 16 of the base bracket 12 and 5/32 inches (3.96875 mm) at the flat deck portion of the mount, or the opposite end of the base bracket 12. Those skilled in the art will know these measurements will vary somewhat from time to time because of the drying properties of materials used in the manufacturing of this mount.

As shown in FIGS. 1-6, 8-13, 16-20, the post 14 is a raised portion of the bracket 12. The post is preferably cylindrical column, which allows most standard sized bicycle safety light circular clamps to fit and be tightened on the post 14. The post 14 on the bracket 12 is preferably the same diameter as the majority of bicycle seat posts. This allows the majority of bicycle lights L sold in the marketplace to fit over the post 14 on the bicycle safety light bracket 10. A bicycle safety light mounting bracket 10 as designed is configured in such a fashion to allow bicycle safety lights L with round articulating mounting straps, to be mounted on the round post 14. Preferably, post 14 has a ⅝ inch (15.875 mm) radius and is approximately 1½ inches (38.1 mm) high.

Figure 21:
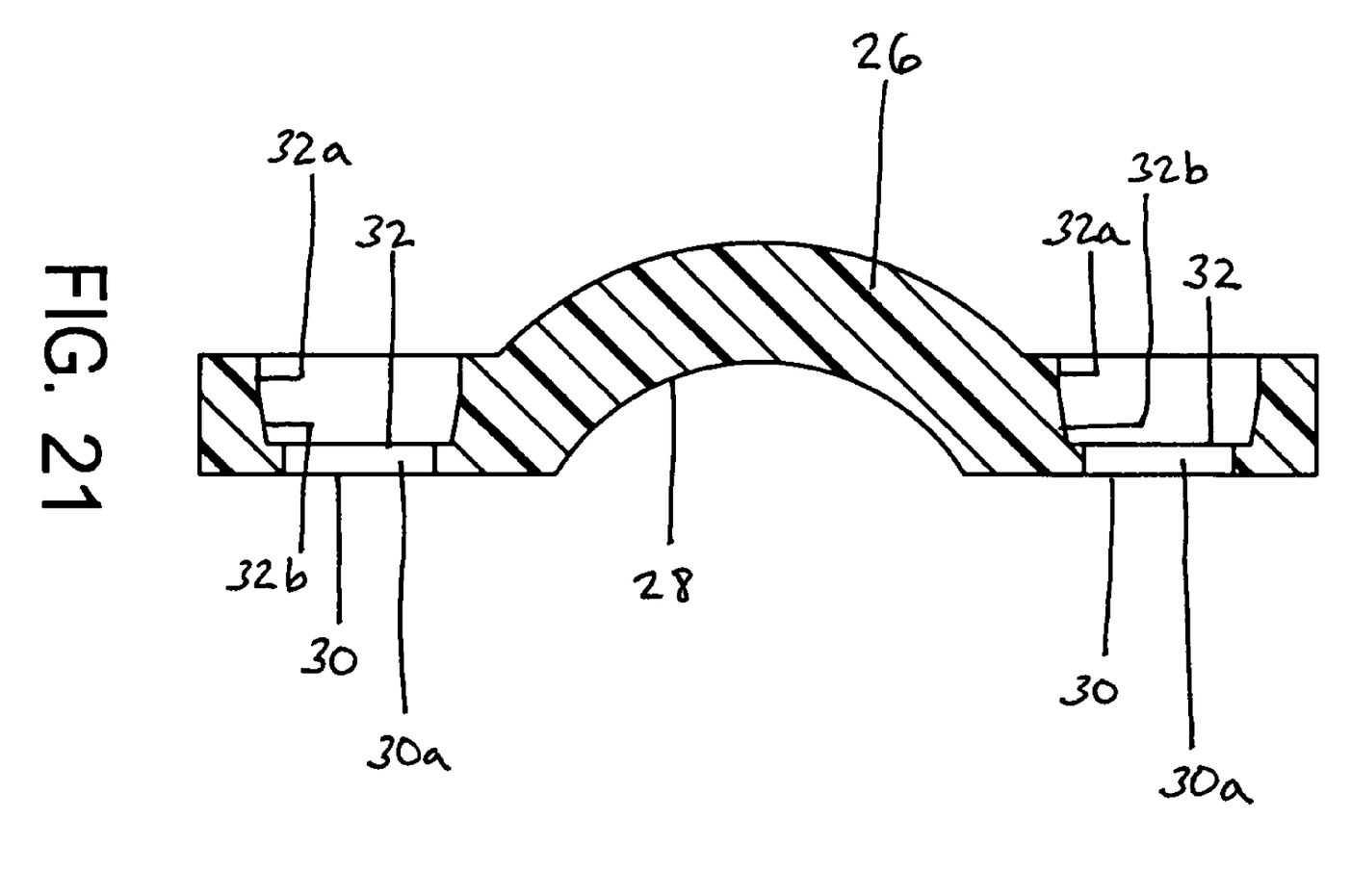
FIG. 21 shows a cross sectional view of an embodiment of the clamp band of a mounting bracket for bicycle safety lights.

As shown in FIGS. 1-5, 7-12, 14, 18-19, 20, the clamp band 26 is preferably a rectangular strip with round ends having a central arch 28 terminating at either end in side bosses 30 with screw holes 30a. Preferably, the clamp band arch 28 has the same arc angle A as the radius grooves 22, 24 of the base bracket 12, although the clamp band arch 28 preferably has a larger arc length than the arc length of the radius grooves 22, 24, as shown in FIGS. 2-5, 9-12. The clamp band arch 28 preferably has a ¾ inch (19.05 mm) radius to allow the mounting bracket 10 to fit a variety of tubular frame sizes. Additionally, the clamp band 26 is preferably approximately 1³⁄₃₂ inches (27.7876 mm) long and ½ inch wide (12.7 mm) and ⁵⁄₁₆ inches (7.9375 mm) thick. As shown best in FIG. 21, the clamp band's 26 side bosses 30 are preferably provided with nut recess pockets 32 which are formed by a straight downward rim 32a followed by a trapezoidal-like inward taper 32b, a more interior room than a traditional straight, non-tapered nut hole, such that a nut 36c which fits easily at the opening of the nut recess pocket 32, once pushed in becomes more snugly fit so it does not easily fall out. The nut recess pockets 32 are continuous with the clamp band 26 side bosses' 30 screw holes 30a, as depicted in FIG. 21. Preferably, the nut recess pocket 32 tapers at a point in which the nut 36b remains ¹⁄₁₆ inch (1.5875 mm) above the uppermost of the nut recess pocket 32 rim 32a. The nut recess pockets 32 are preferably hexagonal so as to provide for a hexagonal head screw 36a, commonly known as a hex head screw 36a, and corresponding hex nut 36b, as shown in FIG. 19. In the preferred embodiment, as shown in FIGS. 8-14, 16, the clamp band 26 is secured directly underneath the center slot 20, such that attaching portions, such as twist ties, cable ties, screws with nuts, hooks, pins, dowels, tape, twine, wire and fishing line, go through the center slot 20 securing the clamp band 26. In this configuration, in which the mounting bracket 10 is perpendicular to the bike part to which it is attached, the mounting bracket 10 extends further out from the bike, thus making the light L more visible and less likely to be covered by the rider or gear. In one embodiment, as shown in FIGS. 1-7, the clamp band 26 is secured directly underneath the receiver bosses 18, such that attaching portions, such as: twist ties, cable ties, screws with nuts, hooks, pins, dowels, tape, twine, wire and fishing line, go through receiver boss 18 screw holes 18a securing the clamp band 26. Preferably, the clamp band 26 is secured to the base bracket 12 with two screws 36a and two nuts 36b, as shown in FIG. 16, although a single screw 36a and nut 36b will suffice.

Attaching portions can be cable ties 36c or screws 36a and nuts 36b, as well as twist ties, hooks, pins, dowels, tape, twine, wire, or fishing line. Regardless of the type of attaching portion used, the mounting bracket 10 can be secured either parallel, see FIGS. 17, 18, 29, 20, or perpendicular, see FIG. 16, to the bike part to which it is attached. As shown in FIGS. 18-19, the clamp band 26 is preferably secured to the base bracket 12 with two screws 36a and two nuts 36b as the attaching portions. FIG. 20 shows mounting bracket 12 in use with a cable tie 36c attaching portion on a standard bicycle head tube T, bicycle stay S, or rack R. FIG. 17 shows mounting bracket 12 in use attached to a bicycle head tube T, which tends to be of larger diameter than other bicycle tubes, with two cable ties 36c for the attaching portions. Cable ties 36c are the preferred attaching portions only when the bike part to which the user wishes to attach the mounting bracket 10 is larger than 0.91 inches (23 mm) in diameter. FIG. 19 shows mounting bracket 12 and attaching portions consisting of two screws 36a and two nuts 36b and demonstrates how the screws 36a fit into the receiver bosses 18 screw holes 18a and then through the clamp band side bosses 30 screw holes 30a, while the nuts 36b are then secured to the screws 36a on the opposite side of the clamp band 26 from which the screws 36a entered. The nuts 36b preferably fit snugly into the nut recess pockets 32 when in place on the screws 36a. Preferably, the screws 36a are 10×32×1¼ (U.S. Unified Thread Standard sized screw, such that the thread length is 1¼ inches, or 31.75 mm). FIG. 16 shows mounting bracket 12 in use attached to a bike rack R by attaching portions consisting of two screws 36a and two nuts 36b. The light mounting bracket 10 can be mounted on the back of the rack R, as shown in FIG. 16, or on the sides of the rack R. FIG. 18 shows mounting bracket 12 in use attached to a bike stay S, specifically the chain stay, by attaching portions consisting of two screws 36a and two nuts 36b. It is preferred that when a screw 36a is used as an attaching portion that a corresponding nut 36b is used to secure the screw 36a.

Mounting bracket 10 can include shims 34, preferably made of rubber, as shown in FIGS. 19 and 20. Shims 34 stabilize the base bracket 12. Shims 34 are preferably perforated so that they can be easily separated to different sizes for use. When the bike part to which the user wishes to attach the mounting bracket 10 is larger than 0.91 inches (23 mm) in diameter, it is preferable to use at least one shim 34 to secure the base bracket 12. One of skill in the art would realize that more than one shim 34 can be used at one time and shims 34 can also be used stacked one upon another.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A bicycle mounting bracket for safety lights, comprising:
   a base bracket having a top and a bottom, a clamp band, and one and more fasteners for fastening said clamp band to said base bracket around a bicycle part;
   wherein said base bracket includes first and second ends; a round post projecting perpendicularly from said first end of the top of said base bracket, a first pair of screw holes disposed across the width of said second end of said base bracket on the second end for receiving one or more fasteners; a center slot extending partially along the center axis of said base bracket and disposed at least partially between said first pair of screw holes; and, first and second radiused grooves disposed into the bottom of said base bracket, said first groove extending the length of the center axis of said base bracket and said second groove extending the width of said base bracket perpendicular to said first groove, and wherein said second groove is aligned with said first pair of screw holes; and,
   wherein said clamp band includes an arch, and a second pair of screw holes corresponding to said first pair of screw holes.

2. The mounting bracket of claim 1, further comprising at least one shim.

3. The mounting bracket of claim 1 or 2, wherein each of said second pair of screw holes includes a nut recess pocket with a rim, said rim having a straight portion and a tapered portion extending from said straight portion.

* * * * *